United States Patent Office.

HUGH McHUGH, OF NEW BEDFORD, MASS., ASSIGNOR, BY MESNE ASSIGNMENTS, TO HIMSELF AND THOMAS L. MANCHESTER, OF SAME PLACE.

MANUFACTURING PICTURE-FRAME MOLDINGS.

SPECIFICATION forming part of Letters Patent No. 332,815, dated December 22, 1885.

Application filed October 1, 1885. Serial No. 178,760. (Specimens.)

*To all whom it may concern:*

Be it known that I, HUGH McHUGH, of New Bedford, in the county of Bristol, of the Commonwealth of Massachusetts, have invented a new and useful Improvement in the Mode of Manufacturing Picture-Frame Moldings from Plastic Materials or Compositions; and I do hereby declare the same to be described in the following specification, the nature of my invention being defined in the claims hereinafter presented.

The article made by my invention or process is formed on a machine, as represented and described in Letters Patent No. 324,399, granted to myself and Thomas L. Manchester.

The composition, generally embossed and reduced to a strip by such machine, is usually composed of glue, linseed-oil, whiting, and pitch or resin, mixed in suitable proportions to render it plastic or soft, so as to be capable of being stretched, embossed, and cut by the machine in passing between the embossing and bed rollers thereof, and in contact with the circular cutters or knives. To prevent the composition from adhering to the embossing-roller, the periphery of the latter has to be covered with oil; but it will not answer to oil the surface of the bed-roller, as the back or rear surface of the strip of molding would become covered with oil, and as a consequence could not be glued to a surface. It is therefore highly important to have some means of preventing the material or composition from adhering to the periphery of the bed-roller. For this purpose I make use of a strip of paper or cloth, or other suitable flexible material to which the composition will adhere, and which will not adhere to the bed-roller; and I run the said strip with the composition between the embossing and bed rollers, the strip being against the bed-roller, so as to insulate the composition therefrom or prevent it from contact therewith. After the combined strip of insulating material and embossed composition may have been treated by and passed out of the machine, the strip of insulating material is to be drawn off or separated from the embossed composition, in order to prevent the latter from cracking in drying, as it would or might were it to dry in connection with the paper or cloth. The insulating-strip also prevents the back of the strip of composition from becoming uneven or bulged more or less, as it is very apt to without such insulating-strip. Furthermore, the insulating-strip renders the back of the composition better for being glued to a picture-frame or article.

I am aware of the process of making moldings as described in the United States Patent No. 249,429, and I do not claim such, as in such no oil is used on the embossing-surface of the embossing-roller, and the strip of paper is not, after being applied to the composition, separated therefrom, to allow it to contract without cracking or becoming more or less distended or bulged.

I claim—

1. In manufacturing a picture-frame molding by running a plastic composition of which it is made between an embossing-roller and a bed-roller, oiling the embossing-surface, and passing between the composition and the bed-roller and against them while the two rollers are in operation on the composition a strip of paper, cloth, or other suitable flexible material, such as will adhere to the composition and not to the bed-roller and pass with such composition between the two rollers, all being substantially as set forth.

2. In manufacturing a picture-frame molding by running a plastic composition of which it is made between an embossing and a bed roller, oiling the embossing surface, passing between the composition and bed-roller and against them while the two rollers are in operation on the composition a strip of paper, cloth, or other suitable flexible material, such as will adhere to the composition and not to the bed-roller, and subsequently detaching or separating the said strip from the embossed composition, all being essentially as specified.

HUGH McHUGH.

Witnesses:
THOMAS BRADBURY,
HENRY WARD PARKER.